L. A. GRIFFIN.
ASH CONVEYER.
APPLICATION FILED JULY 11, 1919.

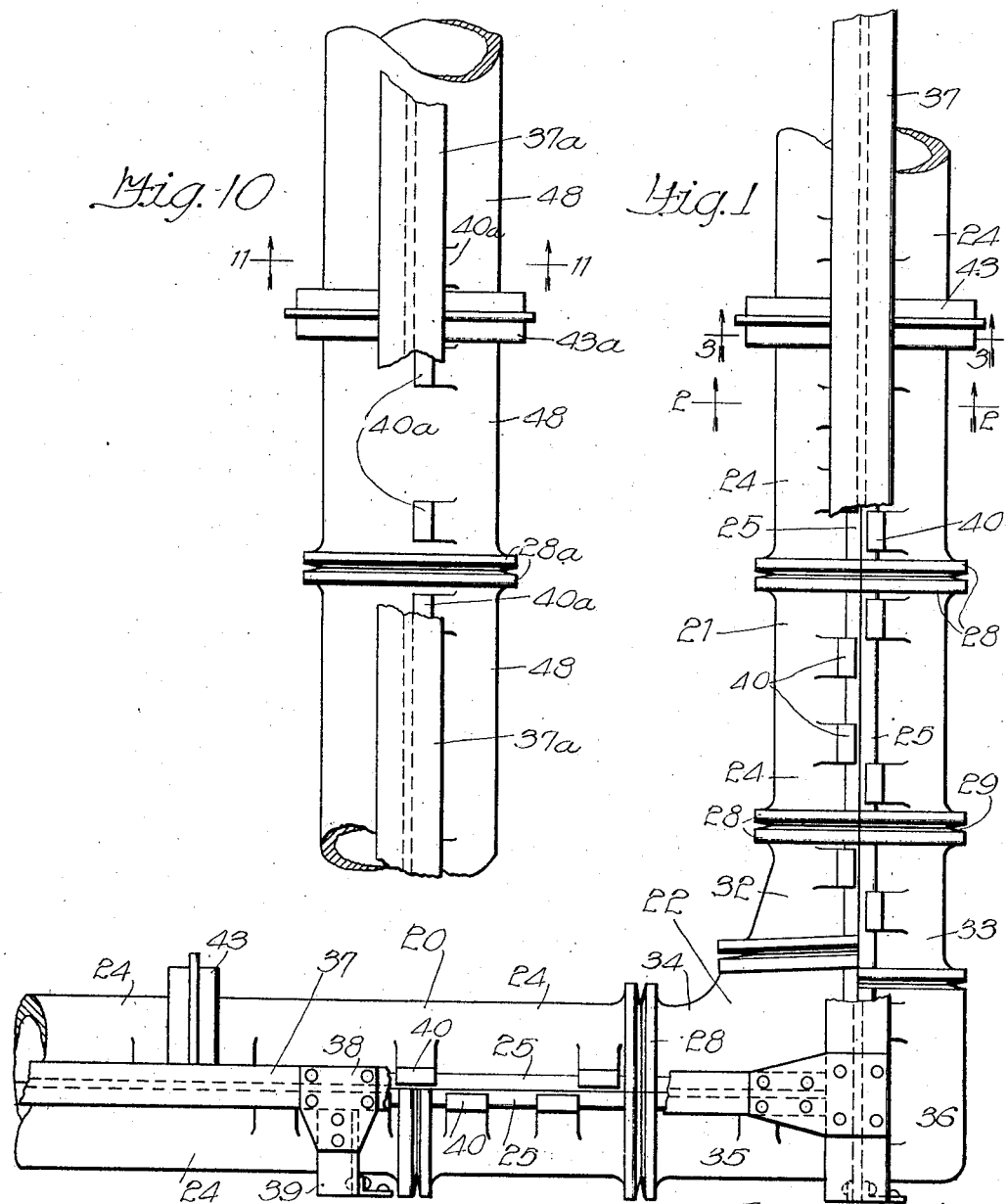

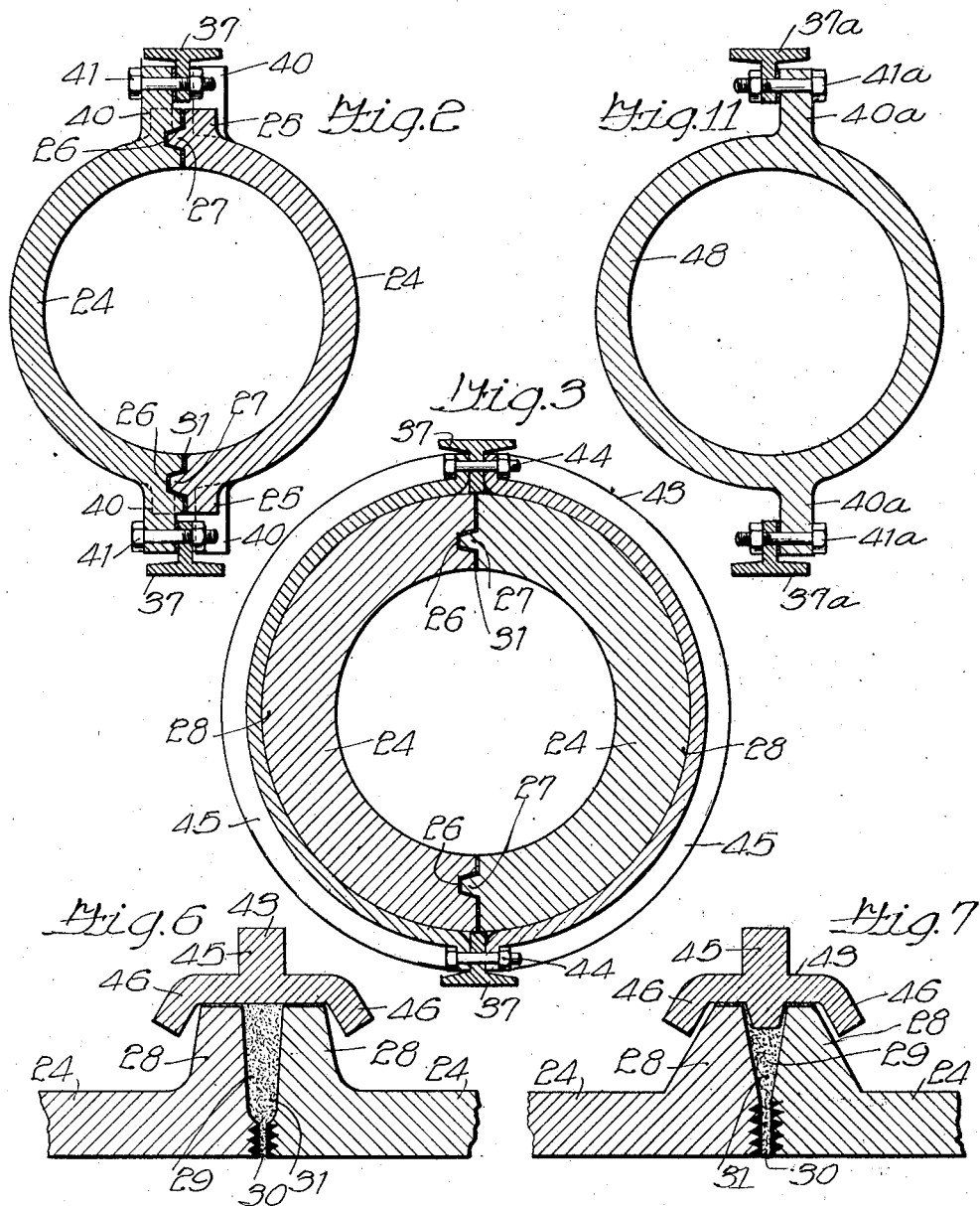

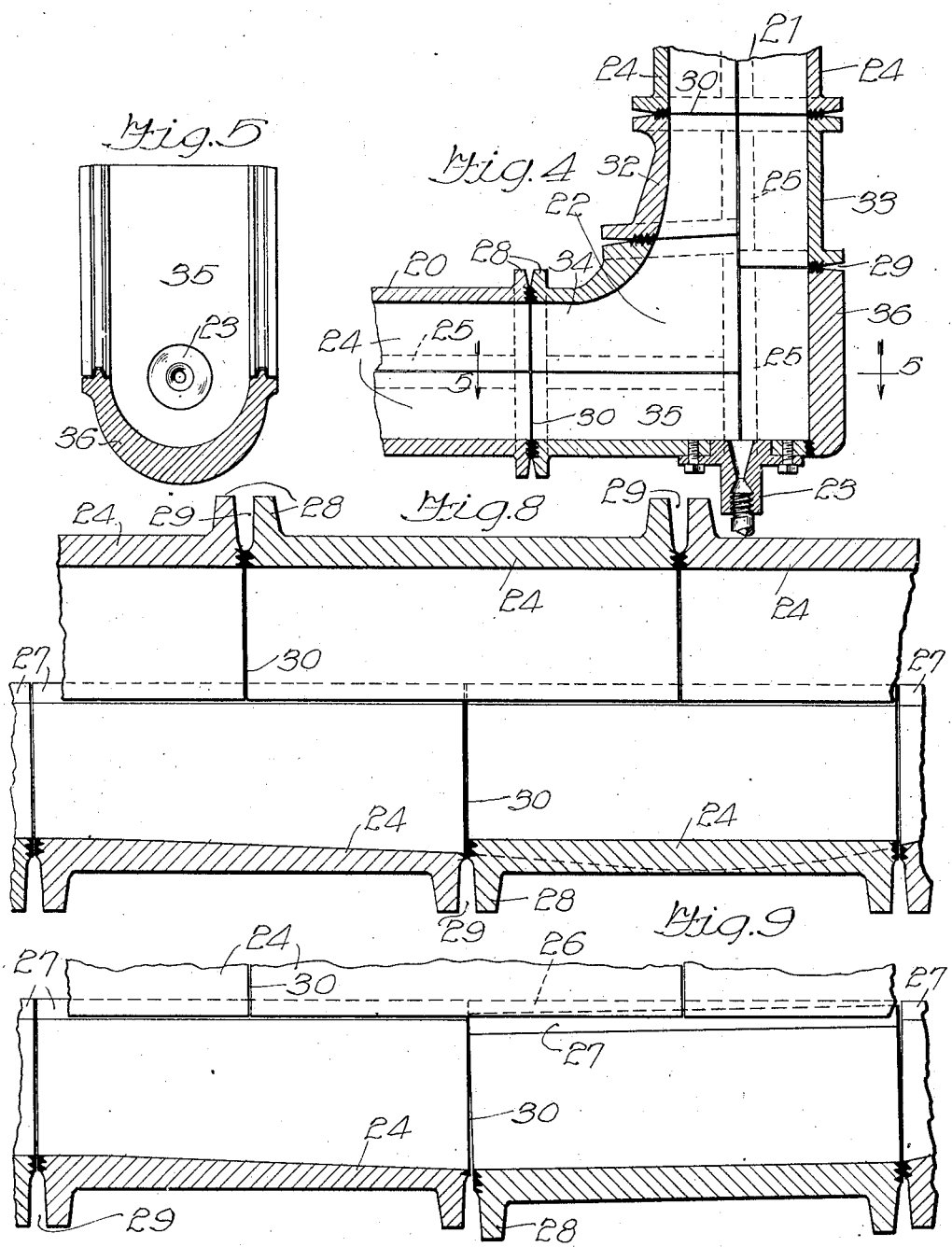

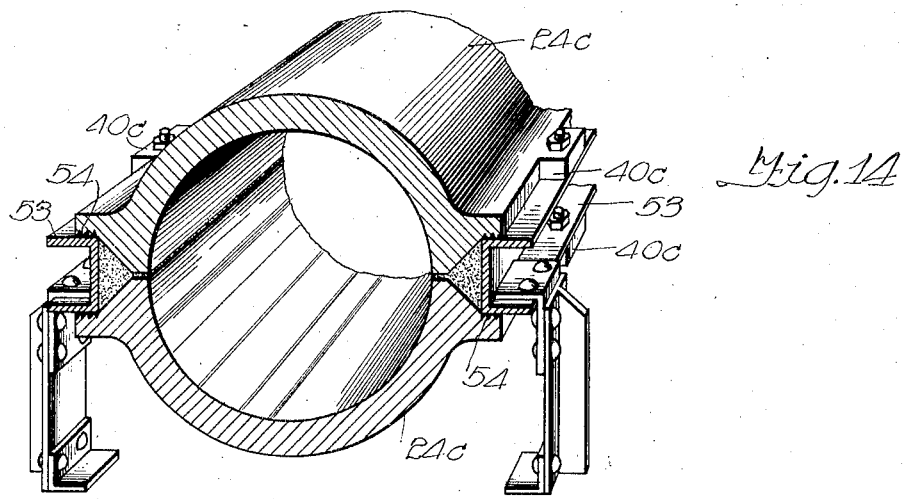
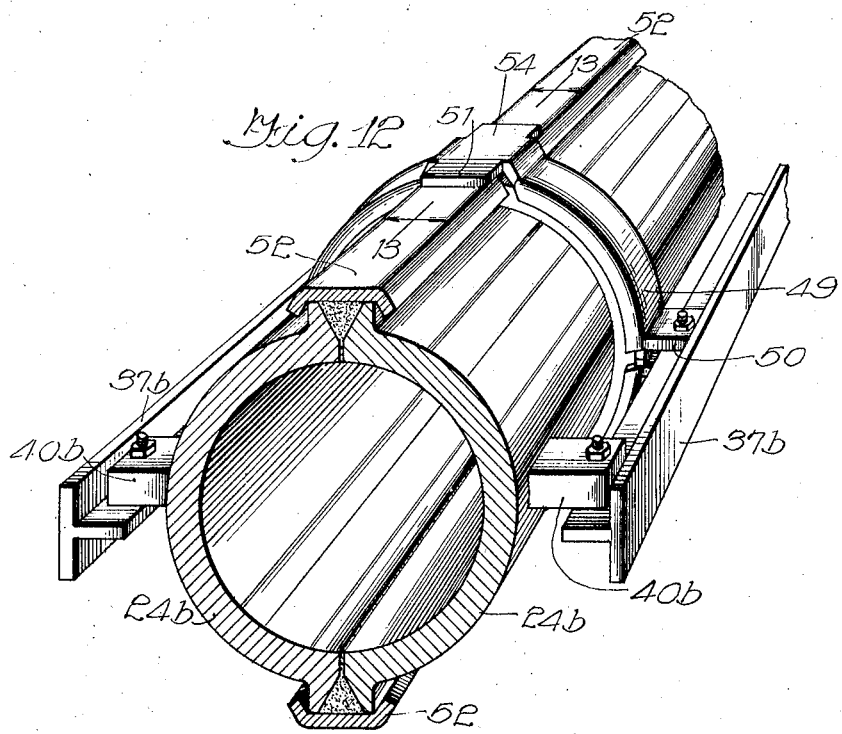

1,329,522.

Patented Feb. 3, 1920.
5 SHEETS—SHEET 5.

Inventor
Lorne A. Griffin
William Bradbury & Co
Attys.

UNITED STATES PATENT OFFICE.

LORNE A. GRIFFIN, OF EVANSTON, ILLINOIS, ASSIGNOR TO THE AMERICAN STEAM CONVEYOR CORPORATION, OF CHICAGO, ILLINOIS, A CORPORATION OF NEW YORK.

ASH-CONVEYER.

1,329,522.      Specification of Letters Patent.      Patented Feb. 3, 1920.

Application filed July 11, 1919. Serial No. 310,072.

*To all whom it may concern:*

Be it known that I, LORNE A. GRIFFIN, a citizen of the United States, residing at Evanston, in the county of Cook and State of Illinois, have invented a certain new and useful Improvement in Ash-Conveyers, of which the following is a full, clear, concise, and exact description, reference being had to the accompanying drawings, forming a part of this specification.

My invention relates to ash conveyers and broadly stated, one feature of my invention consists in the provision of novel and improved means for mounting and supporting the various elements of an ash conveyer conduit. My invention is also concerned with the provision of improved means for affording and insuring tight joints between the several elements of which such a conveyer conduit is made up.

My invention is especially adaptable to ash conveyers of the steam jet type, although, I appreciate the fact that its use is not so limited. As is now generally known, an ash conveyer of this type comprises a metal conduit leading from points at or adjacent to furnaces from which the ashes are to be conveyed, to a suitable ash tank or other point where the ashes are to be deposited. The ashes are caused to travel through the conduit by injecting steam under pressure into the conduit at one or more points. In such systems, it has been found necessary to make the several elements of the conduit quite heavy and of comparatively large size on account of the abrasive action of the ashes that are caused to travel therethrough in the normal operation of the conveyer. Because of the very considerable weight and size of the elements of which the conduits have been formed, when secured together by the usual devices heretofore employed, it has been an extremely difficult matter to effect replacements and repairs and also a difficult matter to keep a conduit tight which, of course, is a matter of no small moment in an ash conveyer of the steam jet type or of the pneumatic type. Ash conveyer conduits in use at the present time, without exception, I believe, comprise pipe sections together with the usual elbows and other fittings, all of which are secured together by bolts passing through abutting flanges carried by the pipe sections and other fittings. In such a conduit each element contributes to the support of the other elements and in the vertical runs of pipe, in particular, each element supports and carries the weight of the elements above it. Since practically all of the elements are very heavy and in many cases cumbersome, it has not only been difficult to properly assemble the several parts of such a conduit, but it has been extremely difficult to make replacements, which is a much more serious objection, since such replacements are oftentimes made by persons who are not particularly familiar with such work and who almost invariably are without facilities for jacking up or otherwise supporting such a conduit when one or more of the sections thereof are to be removed for repairs or replacement.

With a view to dispensing with the difficulties and objections inherent in ash conveyer conduits, as heretofore employed, my present invention among its objects contemplates:

First. An ash conveyer system wherein each one of the various elements of the conveyer conduit which it may be necessary to repair or replace may be removed from the assembly without, in any way, removing or impairing the support which is afforded the other elements of the conduit.

Second. An ash conveyer system wherein the several elements of the conveyer conduit are retained in proper relation to each other without necessarily bolting contiguous elements together as has heretofore been the practice.

Third. An ash conveyer conduit wherein every pipe section is held in the proper relation to its contiguous pipe section but is supported independently of the latter.

Fourth. An ash conveyer conduit comprising in its make up semi-cylindrical wear sections, each of which is supported independently of the wear sections adjacent thereto.

Fifth. An ash conveyer conduit comprising improved means for affording tight joints between the several elements of which the conduit is formed.

Sixth. A conveyer conduit consisting wholly or in part of a plurality of semi-cylindrical wear sections and means for affording tight joints between them, said last mentioned means being so arranged that within certain limits new and worn sections of the conduit may be fitted together without producing objectionable shoulders or projections in the conduit passage.

Seventh. An ash conveyer conduit, every element of which is mounted upon a supporting frame-work that is co-extensive with the conduit.

These and other objects of my invention are more fully set forth in the description to follow wherein reference is made to the accompanying drawings, in which:—

Figure 1 is an elevational view illustrating an ash conveyer conduit embodying the improvements of my invention;

Fig. 2 is a cross-sectional view taken on the line 2—2 of Fig. 1 and looking in the direction indicated by the arrows;

Fig. 3 is a cross-sectional view taken on the line 3—3 of Fig. 1, and looking in the direction indicated by the arrows;

Fig. 4 is a vertical-sectional view of the right angle elbow forming a part of the conduit shown in Fig. 1;

Fig. 5 is a horizontal sectional view taken on the line 5—5 of Fig. 4 and looking in the direction indicated by the arrows;

Fig. 6 is a fragmentary sectional view illustrating the joint between the end flanges of contiguous semi-cylindrical wear sections;

Fig. 7 is a view similar to Fig. 6, illustrating a modified form of joint;

Figs. 8 and 9 are fragmentary sectional views of conduit embodying my invention and illustrating one particular advantage of my invention when it becomes necessary to replace a worn wear section;

Fig. 10 is an elevational view of modified conduit construction, certain parts being broken away more clearly to reveal the construction;

Fig. 11 is a cross-sectional view taken on the line 11—11 of Fig. 10 and looking in the direction indicated by the arrows;

Fig. 12 is a view in perspective of another modification of my invention;

Fig. 14 is a view in perspective of a further modification of my invention, and

Figure 15:
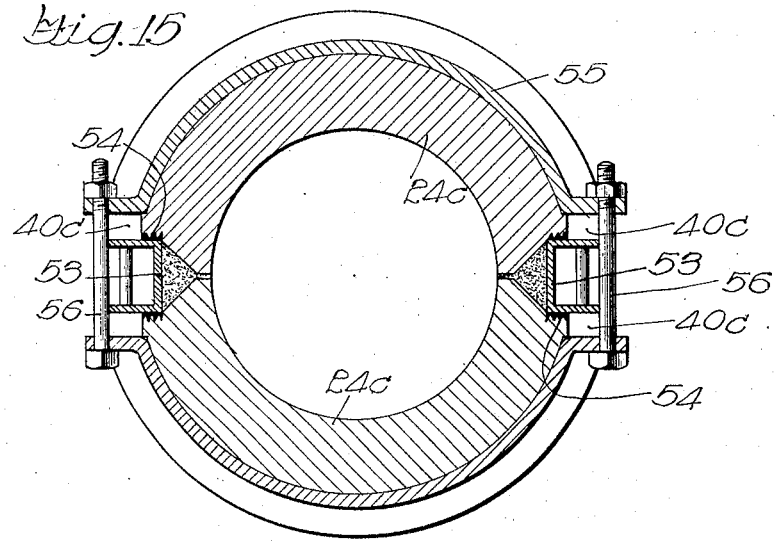
Fig. 15 is a view partly in section and partly in elevation, illustrating the application of the bands for completing the joints between the end flanges of the semi-cylindrical wear sections, when the arrangement shown in Fig. 14 is employed.

Referring first to Fig. 1, at 20 is indicated a horizontal run of the steam ash conveyer conduit; at 21 is a vertical run constituting a part of the same conduit and at 22, a sectional right angle elbow which connects the horizontal and sectional runs of the conduit and is provided with an upwardly discharging steam nozzle, 23. It will be understood that that portion of the horizontal run which has not been shown is ordinarily provided with hoppers, through which the ashes to be conveyed are introduced to the conveyer conduit and that the vertical run leads off to an ash pile, ash tank or other receptacle. With these last mentioned elements, the ash conveyer system of my present invention is not particularly concerned.

The horizontal and vertical runs of the conveyer conduit consist of a plurality of semi-cylindrical chilled iron wear sections, 24—24, which are so disposed as to provide an unobstructed and cylindrical conduit passage, i. e., the said cylindrical wear sections are disposed side by side and end to end so that as a whole, they form a continuous cylindrical conduit passage. The two semi-cylindrical wear sections, which coöperate to give the conduit its cylindrical shape, at any given point, may be co-extensive in length as has been illustrated in the case of the wear sections of the vertical run, 21, or the wear sections may be of different lengths and so disposed that the end of one lies between the ends of its oppositely disposed wear sections, as has been illustrated in connection with the horizontal run, 20. In either case, the several semi-cylindrical wear sections coöperate to afford a cylindrical and unobstructed conduit passage.

Each of the semi-cylindrical wear sections, 24, is provided along its longitudinal edges with flanges, 25, which lie opposite corresponding flanges on oppositely disposed wear section, or wear sections, as the case may be. As is perhaps most clearly shown in Fig. 2, the flanges, 25, of one wear section in each case is provided with comparatively deep and substantially V-shaped longitudinal grooves, 26,—26, while each of the flanges of the oppositely disposed wear section is provided with substantially V-shaped ribs, 27, said ribs being received in the aforesaid grooves 26—26. At the present point in this description, it will suffice to say that the grooves and ribs mentioned, afford very effective labyrinth joints between the oppositely disposed semi-cylindrical wear sections. This form of joint affords a particular advantage in this class of work, which will presently be described in more detail.

At their ends, the wear sections, 24, are provided with semi-annular flanges, 28—28, which are so conformed that there is a substantial space, 29, between each pair of oppositely disposed end flanges. In addition to this substantial space, 29, between the sections flanges 28, I prefer that when the sections are assembled there should be a small space, 30, between the end of each wear section and the end of the next wear section, these spaces serving to take care of the expansion and contraction which is inevitable in a heavy metal conduit structure of this class.

In the construction of the conduit when the wear sections are assembled and secured, as will presently be described, the oppositely disposed surfaces of the longitudinal flanges 25, and the several spaces, 29 and 30, are suitably grouted as indicated at 31—31, preferably with a fibrous and cementitious fireproof composition which may be of the kind described and claimed in the patent to James A. Daviess, No. 1,278,869. I may point out that I contemplate scoring any of the flanges in accordance with the teachings of the said Daviess patent at any points where such scoring seems necessary or desirable.

The sectional elbow which has been illustrated in Fig. 4 consists of five elements indicated by the reference characters, 32 to 36, inclusive. These elements of the elbow are disposed as illustrated in Figs. 1, 4 and 5, with the joints between their several oppositely disposed ends and lateral edges grouted similarly to the edges and ends of the wear sections of which the horizontal and vertical runs of the conduit are formed. The nozzle, 23, is bolted to and extends through an aperture in the bottom section 35 of the elbow. I may point out that the several elbow joints which are at right angles or substantially at right angles, to the path of flow of steam and ashes are substantially identical with the joints between the ends of contiguous semi-cylindrical wear sections, 24, whereas the elbow joints which are parallel with the direction of flow of ashes are substantially identical with the corresponding labyrinth joints of the wear sections, 24.

Ash conveyer conduits as heretofore employed, have comprised pipe sections and elbows having abutting end flanges secured together so that whenever it became desirable to remove any pipe section or any fitting, it was necessary to remove a plurality of the bolts by means of which the several elements of the conduit were retained in proper position. In these prior constructions, when one element was removed which necessarily involved removal of some of the bolts upon which the proper relation and support of the other sections depended, great difficulty was encountered, particularly in the case of vertical runs of pipe and in the case of longitudinal runs which were supported above the level of the ground or floor. In such cases, and in the case of vertical runs in particular, it has been necessary to provide elaborate means for supporting the other pipe sections when any one was removed. These difficulties are dispensed with in the conduit of my invention because the several elements are provided with a means for retaining them in the proper relation each to the other, which means supports each element independently of the other elements so that the removal of any element does not displace or withdraw support from the other elements.

As is clearly illustrated in Figs. 1, 2 and 3, I provide a supporting frame-work which is co-extensive with the conduit. This framework is so constructed that at all points along the conduit there are two T bars, 37—37, lying on diametrically opposite sides of the conduit and extending along lines substantially parallel to the axis of the conduit. The frame-work consisting of the T bars is suitably tied together and supported from the ground or floor by any well known means, as, for instance, by tie plates, 38 and struts, 39. The specific construction of the frame-work and the devices for securely mounting the same are not important, the essential point being merely that the frame-work shall be so conformed and strong enough to retain and support the several elements of the conduit as herein described.

The function of the framework is twofold, first, to at all times retain the several conduit elements in proper relation each to the others, without making it necessary to bolt the several elements to their contiguous elements as in ordinary conveyer conduit construction, second, the framework carries the weight of each conduit element independently of all the others so that no conduit element depends upon any other element for its support.

While the specific means for mounting the several conduit elements upon the supporting framework may be varied within wide limits, I prefer to employ the arrangement herein shown. In the present case, each of the conduit elements, i. e., the several semi-cylindrical wear sections, 24, and the several elbow sections are provided with lugs, 40—40, which when the conduit is assembled, lie against the legs of the T bars, 37, and are rigidly secured thereto by bolts, 41. One or more washers, 42, may be interposed between the lugs and the T bars, if desired. The lugs on adjacent and oppositely facing conduit elements are preferably staggered so that they fall at different points along the T bars and, so far as practicable, the general disposition of the lugs is so made that the formation of the apertures in the T bars for the reception of the bolts, 41, may be more or less standard.

In order surely to retain the grouting in the joints between the ends of the semi-cylindrical wear sections, I prefer to employ the arrangement shown in Fig. 6. A semi-circular metal band, 43, lies upon the periphery of the abutting flanges, 28, and is secured to the T bars, 31, by bolts, 44. The band may be provided with a reinforcing rib 45, and is desirably provided with inturned edges 46, between which the spaced flanges 28 are embraced. It will be seen that this arrangement very effectively prevents the grout from being blown out from between the flanges 28.

The arrangement shown in Fig. 7 is substantially the same as that shown in Fig. 6 except that in Fig. 7 the opposing surfaces of the flanges 28 are plane and inclined to give the space 29 a wedge-like cross-section. In this case the ring 43 is provided with an inwardly projecting rib 47, which when the band is in assembled position lies in the space 29. This arrangement is very effective since the space which depends solely upon the grout for its closure is reduced to a minimum.

The particular form of labyrinth joint between the longitudinal flanges 25, 25, of oppositely disposed cylindrical wear sections 24, affords a distinct advantage in making replacements. In the lower right hand corner of Fig. 8 I have illustrated an unworn replacement section which has been substituted for a worn section. The dotted line indicates the joint to which the removed section had been worn in the normal operation of the conveyer. The replacement section being unworn is of greater cross-section than the worn sections between which it is interposed, with the result that with the replacement section supported as shown in Fig. 8, abrupt shoulders or obstructions are formed in the conduit which, if permitted to remain, would not only become worn themselves but, in addition thereto, would so divert the abrasive material from its normal path as to cause excessive wear at other points in the conduit. The labyrinth joint, herein before described, enables me to adjust the replacement section to dispense with these abrupt shoulders, or at any rate, make them insignificantly small. By inserting a sufficient number of washers between the T bars, 37, and the lugs of the replacement section, the inner surface of the replacement section may be caused to lie substantially flush with the inner surface of the wear sections at either end thereof, as has been illustrated in Fig. 9. Since the grooves, 26, and the ribs, 27, of the labyrinth joints are of considerable depth they will, in practically all cases permit all adjustments of the replacement sections that is necessary or desirable without, at the same time, materially affecting the sufficiency of the seal between the longitudinal flanges, 27, of the semi-cylindrical wear sections.

While, in most cases, I may prefer to utilize semi-cylindrical wear sections in the construction of my conveyer conduit, it should be borne in mind that my invention is not limited to the use of such semi-cylindrical sections. In Figs. 10 and 11, I have illustrated a construction wherein the conduit is made up of cylindrical pipe sections, 48, provided with integral lugs, whereby the cylindrical pipe sections are attached to the T-bars of the frame-work. Aside from the fact that in this case, I employ cylindrical pipe sections instead of semi-cylindrical sections, the construction is substantially the same as that in the arrangement previously described.

The several semi-cylindrical pipe sections are held in the proper relation and supported each independently of the others by the supporting frame-work as in the arrangement previously referred to. In Figs. 10 and 11 the same reference characters with the letter "a" added thereto have been applied to parts which correspond to similar parts in Figs. 1 to 9.

Figure 13:
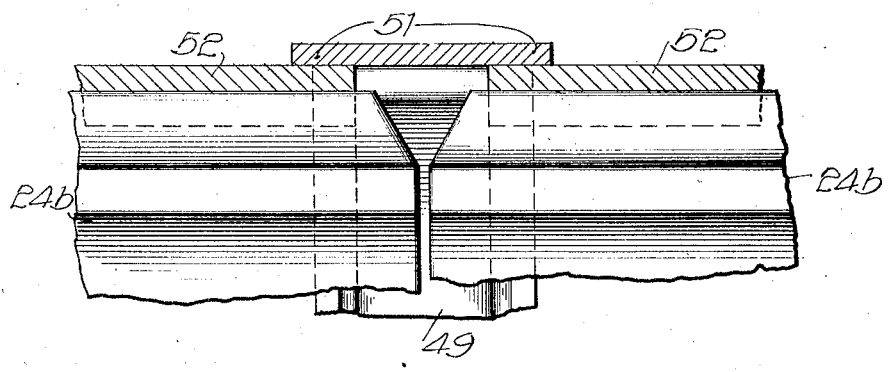
Fig. 13 is a fragmentary sectional view taken on the line 13—13 of Fig. 12 and looking in the direction indicated by the arrows.

In Figs. 12 and 13, I have illustrated a modified form of conveyer construction wherein the conveyer conduit is formed of semi-cylindrical wear sections, whose longitudinal flanges are brought together in a plane at right angles to the plane including the oppositely disposed T bars of the supporting frame-work. In these figures, the T bars are shown at 37$^b$, the semi-cylindrical wear sections at 24$^b$ and the lugs whereby the wear sections are mounted on the frame-work are shown at 40$^b$. The bands which reinforce and protect the joints between the end flanges are illustrated at 49. The bands are semi-cylindrical in shape and contact at their ends, each band being provided near its ends with lugs, 50, which are bolted to the T bars as shown. The lateral edges of the bands, 49, are preferably inturned to embrace the end flanges of the semi-cylindrical pipe sections. Near its center each band is outwardly offset and is provided with wings, 51—51, which lie over the ends of cap strips, 52, which reinforce and protect the grouted joints between the longitudinal edges of the semi-cylindrical pipe sections. This construction obviates the necessity for providing the longitudinal edges of the semi-cylindrical pipe sections with co-acting grooves and ribs. The longitudinal joints grouted and reinforced by cap strips, 52, are very effective.

In the further modification shown in Figs. 14 and 15, the semi-cylindrical pipe sections which have been illustrated at 24$^c$, are brought together in a plane which includes the parallel supporting bars of the framework. The longitudinal flanges of the semi-cylindrical pipe sections 24$^c$, are so conformed that when the pipe sections are assembled, said flanges lie against the upper and lower surfaces of the parallel bars 53, which in this case are outwardly facing channel irons. The inner surfaces of the longitudinal flanges of the pipe sections may be longitudinally scored as indicated at 54. The semi-cylindrical pipe sections in this modification of my invention, are provided with lugs 40ᶜ, which are bolted to the channel irons 53. The spaces between the longitudinal flanges are filled with suitable grouting material which is reinforced and protected by the inner faces of the channel irons. In connection with this arrangement, the grouted joints between the ends of contiguous pipe sections are reinforced and protected by semi-cylindrical bands 55, which encircle the end flanges, the ends of said bands being secured by bolts 56, as is clearly illustrated in Fig. 15.

While I prefer to employ the form of grouting herein shown and described, it is to be understood that my invention is by no means so limited. I contemplate the use of any suitable filling or packing material in the joints between conduit sections.

While I have illustrated my invention in a number of embodiments, which at the present time appear to be preferred constructions, I do not limit myself to these arrangements but desire to claim all equivalent constructions coming within the terms and spirit of the appended claims.

Having thus described my invention, what I claim as new and desire to secure by Letters Patent of the United States is:

1. An ash conveyer comprising a conduit consisting of a plurality of pipe sections together with supporting means common to the several sections for holding the several sections in proper relation, each to the others, and for supporting each of said sections independently of the other sections.

2. An ash conveyer comprising a conduit consisting of a plurality of pipe sections together with a supporting frame-work co-extensive with the conduit to which the several sections are attached, said frame-work serving to retain the several sections in proper relation each to the others and supporting each of said sections independently of the other sections.

3. An ash conveyer comprising a conduit consisting of a plurality of pipe sections, no one of which derives its support from any other section, together with means for holding said sections in proper relation, each to the others, and for supporting each of said sections independently of the other sections.

4. An ash conveyer comprising a conduit consisting of a plurality of sections placed side by side and end to end to provide a continuous conduit passage, together with means common to the several sections for holding the same in proper relation, each to the others, and for supporting each section independently of the other sections.

5. An ash conveyer comprising a conduit consisting of a plurality of pipe sections, disposed with their edges immediately adjacent to each other, but not secured together, packing material filling the spaces between said edges and means for holding said sections in proper relation each to the others and supporting each of said sections independently of the others.

6. An ash conveyer comprising a conduit consisting of a plurality of semi-cylindrical pipe sections disposed with their end and longitudinal edges immediately adjacent to each other but not secured together, packing between the contiguous edges of said semi-cylindrical pipe sections and means for holding said semi-cylindrical sections in proper relation to each other and supporting said sections independently of each other.

7. An ash conveyer comprising a conduit consisting of a plurality of sections which, when assembled, provide a continuous conduit passage, a frame-work co-extensive with said conduit, lugs carried by each of said sections and means for attaching said lugs to said frame-work, whereby said frame-work serves to retain said sections in proper relation each to the others and supports each of said sections independently of the other section.

8. An ash conveyer comprising a conduit consisting of a plurality of semi-cylindrical sections which, when assembled, side by side and end to end, as herein described, provide a continuous conduit passage, a frame-work co-extensive with said conduit, lugs carried by each of said sections and means for attaching said lugs to said frame-work, whereby said frame-work serves to retain said sections in proper relation each to the others and supports each of said sections independently of the other sections.

9. An ash conveyer comprising a conduit consisting of a plurality of pipe sections which, when assembled provide a continuous conduit passage, means for retaining said sections in proper relation to each other and for supporting each of said sections independently of the other sections, filling material between adjacent edges of said sections and bands lying around the joints between said edges, substantially as and for the purpose set forth.

10. An ash conveyer comprising a conduit including a pipe element consisting of two substantially cylindrical sections, said sections being disposed with their edges opposing each other, the opposing edges of said sections being provided with longitudinally extending interlocking grooves and ribs, means for sealing the joints between said sections and means for retaining said semi-cylindrical sections in proper relation to each other.

11. An ash conveyer comprising a conduit including a pipe element consisting of two substantially cylindrical sections, said sections being disposed with their edges opposing each other, the opposing edges of said sections being provided with longitudinally extending interlocking grooves and ribs, means for sealing the joints between said sections together with means common to both of said semi-cylindrical sections for holding the same in proper relation to each other and for supporting each of said sections independently of the other section.

12. An ash conveyer comprising a conduit consisting of a plurality of substantially semi-cylindrical sections, disposed end to end and side by side, the opposing edges of said semi-cylindrical sections being provided with longitudinally extending and interlocking ribs and grooves, together with means sealing the joints between the opposing edges of said semi-cylindrical sections and means for retaining said sections in proper relation to each other.

13. An ash conveyer comprising a conduit consisting of a plurality of separate sections assembled to provide a continuous conduit passage, a frame work co-extensive with the conduit, comprising bars lying adjacent to the conduit sections on opposite sides thereof, and means for attaching each of said sections to said bars whereby the sections are held in proper relation to each other and whereby each of said sections is supported independently of the other sections.

14. An ash conveyer comprising a conduit consisting of a plurality of separate sections assembled to provide a continuous conduit passage, a frame work co-extensive with the conduit, comprising bars lying adjacent to conduit sections on opposite sides thereof, lugs projecting from said sections and means for attaching said lugs to said bars whereby the sections are held in proper relation to each other and whereby each section is supported independently of the other sections.

15. A conduit for a conveyer of the class described consisting of separate sections and means common to the several sections for retaining the same in proper relation to each other and for supporting each section independently of the other sections.

16. A conduit for a conveyer of the class described consisting of separate sections and means common to the several sections for retaining the same in proper relation to each other and for supporting each section independently of the other sections.

In witness whereof I hereunto subscribe my name this 9th day of July, 1919.

LORNE A. GRIFFIN.

Witnesses:
  A. G. McCaleb,
  Edna V. Gustafson.